May 14, 1963 O. TSCHUMI 3,089,919

TELEPHONE SYSTEM INCLUDING ELECTRO-ACOUSTIC TRANSDUCERS FOR CALL SIGNALLING PURPOSES

Filed Dec. 23, 1957 2 Sheets-Sheet 1

INVENTOR
OTTO TSCHUMI

BY

May 14, 1963 O. TSCHUMI 3,089,919

TELEPHONE SYSTEM INCLUDING ELECTRO-ACOUSTIC TRANSDUCERS FOR CALL SIGNALLING PURPOSES

Filed Dec. 23, 1957 2 Sheets-Sheet 2

INVENTOR
OTTO TSCHUMI

BY

United States Patent Office
3,089,919
Patented May 14, 1963

3,089,919

TELEPHONE SYSTEM INCLUDING ELECTRO-ACOUSTIC TRANSDUCERS FOR CALL SIGNALLING PURPOSES

Otto Tschumi, Solothurn, Switzerland, assignor to Autophon Aktiengesellschaft, Solothurn, Switzerland Filed Dec. 23, 1957, Ser. No. 704,600
Claims priority, application Switzerland Dec. 28, 1956
2 Claims. (Cl. 179—2)

Figure 1:
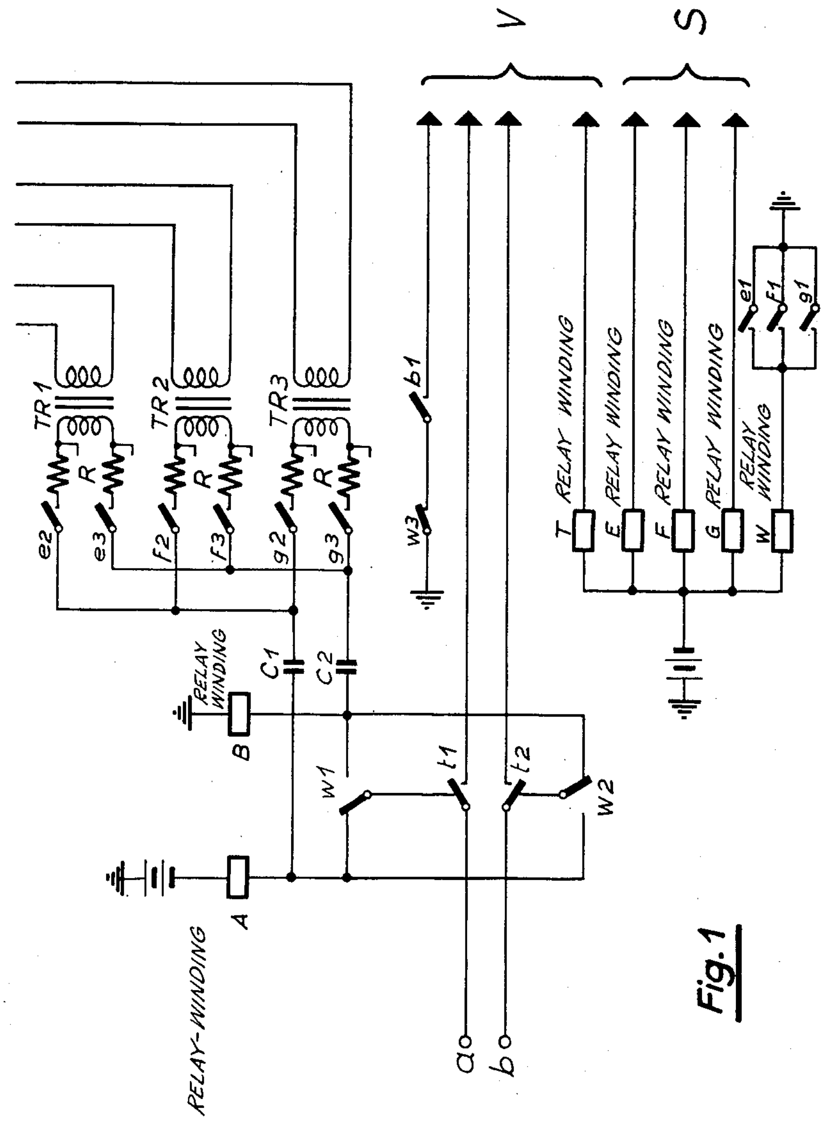

This invention relates to telephone systems, and more particularly to a telephone system including an exchange and subscribers' sub-stations and comprising an electro-acoustic transducer for call signalling purposes.

Telephone sub-stations wherein the conventional bell is replaced by an electro-acoustic transducer, are known in the art. A transducer employed in this fashion is operated by means of a tone frequency signal supplied via the subscriber's line and amplified by an amplifier incorporated in the station. A call signalling system of this kind has proved advantageous for use in telephone systems wherein the exchanges are equipped with electronic controls, as it dispenses with the necessity to use for call signalling purposes, an alternating current having a relatively high voltage.

It is an object of the present invention to utilize the electro-acoustic transducers provided in stations forming part of a system of the afore-noted kind, for the reproduction of signals other than a call signal, or of speech, such signals being exemplified by time, fire alarm, air-raid warning, reveille, air situation signals, etc.

It is a further object of the invention to utilize electro-acoustic transducers for the purpose just described, at only relatively small extra cost.

Other objects, and the manner in which the same are obtained, will become apparent as this specification proceeds.

The invention contemplates a telephone system including an exchange and sub-stations which comprise cradle switch contacts, an electro-acoustic transducer provided in each station for call signalling purposes and a transistor amplifier serving to supply such transducer, this amplifier being susceptible of being switched on by a switch-on criterion sent via the line. More particularly, this telephone system is distinguished by the fact that the exchange includes equipment for transmitting intelligence other than call signals, via any subscribers' lines to which stations are connected wherein the cradle switch contacts are in their normal positions. In the course of the afore-noted transmission of intelligence, the exchange is equipped to send simultaneously a criterion for switching on the above-noted amplifier.

In the drawing accompanying this specification and forming part thereof, an embodiment of the invention including the circuits in the telephone exchange co-ordinated with one individual subscriber, and the circuits in a sub-station, is shown diagrammatically by way of example.

In the drawing,

FIG. 1 represents the circuits co-ordinated with a single subscriber, in a telephone exchange equipped according to the invention, the illustration of the circuits being limited to the components essential for an understanding of the invention. Although the invention is particularly adapted for use in telephone systems including electronic controls, the conventional relay type of control is resorted to for purposes of illustration, for the sake of simplification.

Figure 2:
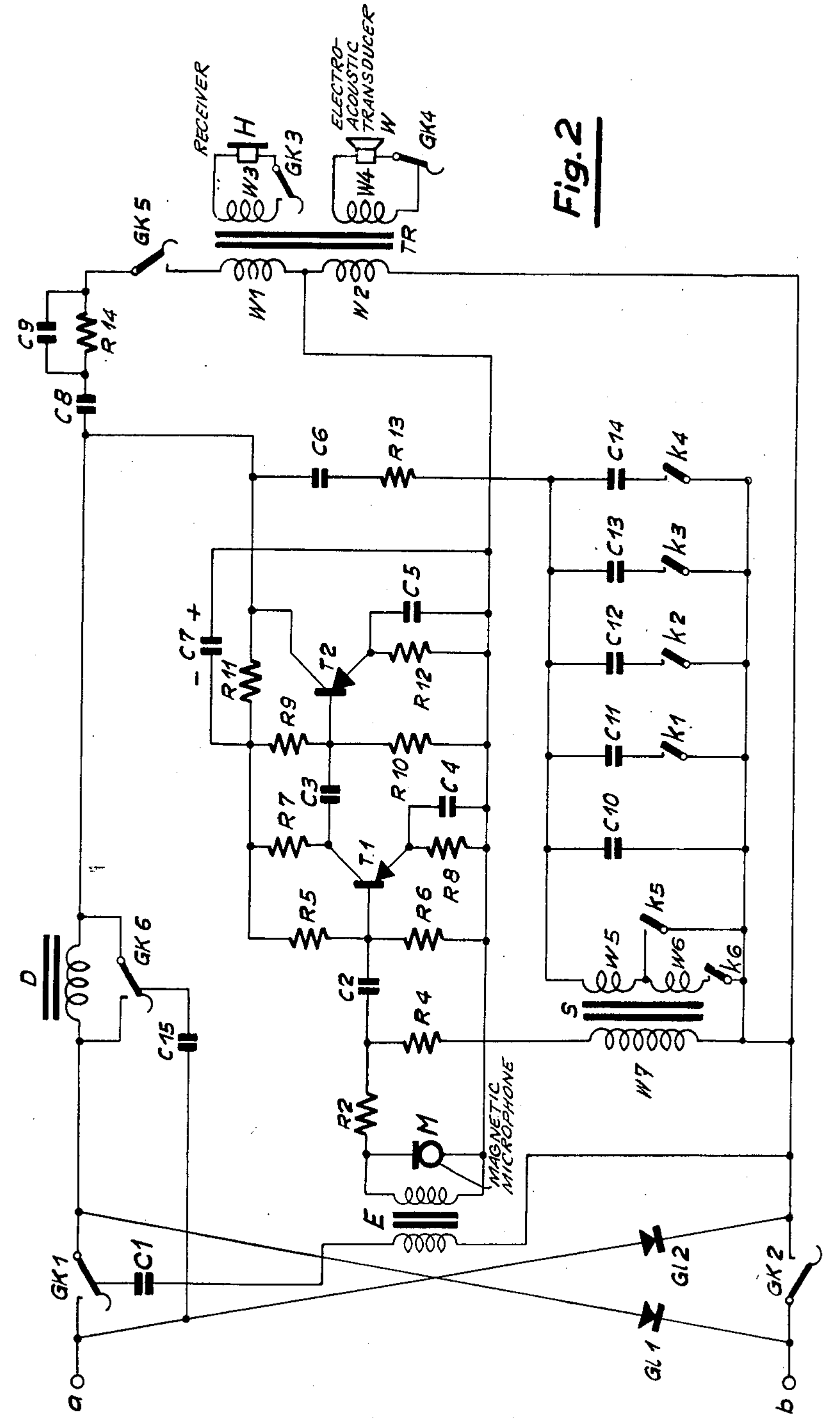

FIG. 2 illustrates the circuit of a sub-station forming part of a telephone system according to the invention; in addition to the electro-acoustic transducer and the amplifier therefor, this station includes equipment for emitting tone frequency selection criteria wherein this amplifier is utilized. In the course of a conversation, the same amplifier is utilized as the microphone amplifier.

Referring now to the drawing, and first to FIG. 2, this sub-station corresponds, as far as its basic design is concorned, to the well known station equipped with a differential transformer, the carbon microphone being replaced by the output of the microphone amplifier. The differential transformer TR with its four windings W1–W4 effects—insofar as the cradle switch contacts GK are in their operating positions—in conjunction with the balancing network consisting of the resistor R14 and the condensers C8 and C9, in a well known manner, a side tone damping between the amplifier output and the receiver H. Inasmuch as this circuit has no direct bearing on the invention, it is not described in greater detail. In addition, the station incorporates a magnetic microphone M and a microphone amplifier operating with the transistors T1 and T2. This amplifier is switched on by the closing of the cradle switch contacts and when thus switched on, requires a negative polarity on the a-wire and a positive polarity on the b-wire. Compared with an ordinary amplifier, it displays the special feature that it is supplied via the same terminals to which the output is passed. In order to make sure that the supply is free of the output signal, a filter section consisting of the resistor R11 and the condenser C7 is provided which uncouples output and supply. Across the condenser C7, therefore, exists a constant direct voltage of the polarity indicated in the drawing. Due to the effect of the condenser C8, the total direct current of the line passes as supply, to the microphone amplifier.

The microphone amplifier operates as follows: the signal passes from the microphone M through the resistor R2 and the condenser C2, to the base of the transistor T1, the condenser C2 serving for blocking the microphone with respect to the direct voltage. The base of the transistor T1 receives a negative bias with respect to the emitter by means of the voltage divider consisting of the resistors R5 and R6. The collector current passing through the resistor R7 is modified by the current deriving from the microphone which is effective between the base and the emitter. The voltage generated on the resistor R7 is passed through the condenser C3, to the base of the second transistor T2. The resistor R8 bridged by the condenser C4 serves for stabilizing the collector current in that it has a negative feed-back effect as far as direct current is concerned. Such a stabilization is a necessity because of the very outspoken dependence on temperature, of the transistors. The second amplifier stage including the transistor T2 is designated analogous to the first stage.

The system by which the station emits audio frequency selection criteria, is switched on by means of 10 keys which actuate the contacts denoted with *k* in the manner requiring no detailed description. The sounds are generated by the frequency determining elements shown in the lower portion of FIG. 2, in conjunction with the microphone amplifier. These elements consist of the coil S including three windings W5–W7 and the capacitances C10–C14. The closing of the contact *k5* provides an oscillating circuit consisting of the condenser C10 and the winding W5, whereas the closing of the contact *k6* provides such a circuit including the two windings W5 and W6. If in addition to *k5* or *k6*, one of the contacts *k1*–*k4* is actuated, one of the capacitances C11–C14 is connected in parallel to the capacitance C10, so that a total of 10 oscillating circuits each having a different frequency, can be formed. The oscillating circuits are coupled, on the one hand, through the winding W7 and the resistor R4, to the input of the microphone amplifier and on the other hand, through the condenser C6 and the resistor R13, to the output of this amplifier. The conditions are so chosen that as soon as an oscillating circuit is formed by the closing of one of the contacts *k*5 or *k*6, a feed-back of such magnitude occurs that the microphone amplifier oscillates and thus operates as voice frequency generator at the frequency determined by the respective oscillating circuit involved. The contacts *k*, in this connection, are so controlled by the keys that on depression of each key, always one of the contacts *k*5 or *k*6, and possibly an additional one of the contacts *k*1–*k*4 is closed. Thus it is possible to emit selection criteria in the form of 10 different sounds. Owing to the assistance of the microphone amplifier in the generation of the selection criteria, the expenditure required therefor is quite small.

For calling purposes the amplifier incorporated in the station must be set operating while the cradle switch contacts are in their normal position. This is effected with the assistance of the rectifiers Gl 1 and Gl 2 by reversal of the polarity of the subscriber's line, i.e. by placing plus on the *a*-wire and minus on the *b*-wire. The open cradle switch contacts thus are bridged by the rectifiers, and at the same time the supply is fed to the microphone amplifier with the correct polarity. The calling signal transmitted by the exchange via the subscriber's line passes via the rest side of the cradle switch contact GK1, the condenser C1 and the transformer TRO to the input of the microphone amplifier. The signal is amplified in the same manner as the microphone signals are amplified during a conversation and is passed through the windings W2 and W4 to the electro-acoustic transducer W. The windings W1 and W3 are cut off by means of the cradle switch contacts GK5 or GK3, respectively. The condenser C15 switched in through the contacts CK6 in the normal position of the station, effects as far as alternating current is concerned, a short circuit for the amplified signal. In conjunction with the inductance coil D, it impedes the return of amplified energy to the subscriber's line, which return would result in so powerful a positive or negative feed-back of the amplifier that the proper function of the system would be placed in jeopardy. Preferably the conditions are so selected that the signals on the subscriber's line do not exceed a level of one milli-watt, in order to avoid cross-talk between different subscribers' lines.

For purposes of amplifying the signals which do not serve for calling the station, the station is operated and switched on in the same manner as described above with respect to the call signals. In this event, the electro-acoustic transducer reproduces, in the place of the call signal, other signals or speech.

Referring now to FIG. 1, the circuits represented in this figure are located in the exchange and—except for the transformers TR1–TR3—are assigned to one individual subscriber whose line is connected at *a* and *b*, The relay coils are denoted by capital letters whereas the contacts are denoted by the corresponding small letters. In the normal position, the pole *a* of the subscriber's station is connected via the contacts *t*1 and *w*1, and the relay coil A, with the negative pole of the battery. The pole *b* of the station is connected via the contacts *t*2 and *w*2 and the winding B, with ground. When, by a loop closure effected from the station, the exchange is called, the two relays A and B pull. The relay B marks, with its contact *b*1, the calling station in a line finder circuit connected at V but not shown in the drawing. As soon as the circuit has found the calling station, the relay T is grounded, with the result that the relay T pulls, cuts off by means of its two contacts *t*1 and *t*2, the station from the relays A and B and connects the station with the afore-mentioned line finder circuit. From this circuit, the dial tone is communicated to the subscriber and in this circuit, the tone selection criteria composed in the station are received.

When a call comes through from the exchange to the subscriber, final selector circuits connected at V but not shown in the drawing, ground the relay T whereupon this relay pulls and cuts off the calling circuit containing the relays A and B. At this point, the afore-mentioned final selector system reverses the polarity of the line and thereby, initiates the operation of the amplifier forming part of the sub-station to be called. At the same time, the final selector circuit places a tone signal on the line which is amplified in the station in the manner described above, and is then passed to the electro-acoustic transducer causing the same to emit a call signal. Inasmuch as the position of the cradle switch contacts has a decisive influence on the direct current passing through the station only when the normal polarity is placed on the station, the polarity is reversed so as to correspond to the normal polarity during every interval between call signals in order to ascertain whether the call is being answered. Once the cell is terminated the circuits return to their normal conditions.

If special signals are to be transmitted, circuits connected at S but not shown in the drawing, serve for energizing one of the relays E–G, for example the relay E. This relay, by means of its contact *e*1, places a potential on the relay W which, by means of its contacts *w*1 and *w*2, reverses the polarity of the line to the station whereby the relay B is placed on the *a*-wire, and the relay A on the *b*-wire. In consequence, the amplifier of the connected station is switched on. The relay E, by means of its contacts *e*2 and *e*3, establishes, through the resistor R and the condensers C1 and C2, a connection between the transformer TR1 and the line *a, b,* to the sub-station. A special signal is supplied via the transformer, is then passed to the station in the manner just described, is amplified in the station and then passed to the electro-acoustic transducer which reproduces it in an audible manner. A single transformer serves several subscribers, the resistors R being relied upon to mutually uncouple the several subscribers' lines which are connected in parallel. This uncoupling is necessary as otherwise, by a short-circuited line, the signals for all the subscribers connected to the same transformer could be short-circuited. The relays F and G are connected in similar manner as relay E. They serve the purpose of establishing the necessary connections for special signals supplied via the transformers TR2 and TR3, respectively.

The relays E–G are actuated by the control device connected at S but not shown in the drawing, either separately for individual subscribers according to a predetermined program, or else for groups of subscribers or for all subscribers simultaneously. Thus, for example, the time of day information may be connected with the transformer TR1, while the transformer TR2 may be connected with an alert signal or a phonograph which continuously repeats a certain request or reminder. The transformer TR3, for example, may serve for transmitting a general alarm. On these purely illustrative premises, the first signal, to wit, the time signal, can be transmitted to various subscribers according to a plan established in advance for each subscriber individually, so one will receive the signal once an hour, while others may receive it every quarter of an hour, etc. The second signal can be switched on as a reveille or reminder signal at a time predetermined by every individual subscriber. The third signal, finally is switched on for all subscribers simultaneously, in an emergency. A very large number of similar applications are evidently possible, and it is one of the outstanding advantages of the invention that it is susceptible of a great many variations in response to the diversified demands of any particular system wherein the invention is to be incorporated.

The circuits disclosed are purely illustrative as the basic concept of the invention can be embodied in a large variety of circuits the details of which depend primarily on the type of exchange employed in the system.

I wish it to be understood that I do not desire to be limited to the details of construction, circuit arrangement or operation shown and described herein as quite a number of modifications within the scope of the following claims are likely to occur to workers in this field which would not depart from the spirit of this invention nor involve any sacrifice of the advantages thereof.

I claim:

1. A telephone system having an exchange and a plurality of subscriber stations, each subscriber station having an amplifier including two power supply input terminals, and an electro-acoustic transducer energized through said amplifier, first and second conducting lines connecting each said subscriber station with said exchange for applying a D.C. voltage to said terminals from said exchange, switch means for coupling and decoupling said first line to a first one of said terminals and said second line to the second one of said terminals, first rectifier means coupling said first line to said second terminal and second rectifier means coupling said second line to said first terminal, whereby said amplifier is operatively energized by the application of a D.C. voltage to said two lines in a first polarity when said switches are closed and deenergized when said switches are opened, and said amplifier is operatively energized by the application of a D.C. voltage to said two lines in a second polarity reversed from said first polarity when said switches are open, each subscriber station further including means for coupling A.C. signals on said lines to the input of said amplifier, and said exchange including means for transmitting to said amplifier over said two lines call signals and other intelligence when said switches are open and said lines are energized in said second polarity.

2. A telephone system as set forth in claim 1, wherein each subscriber station includes a microphone, means for utilizing the amplifier as a microphone amplifier, and means to couple said amplifier alternatively with said microphone and said transducer.

References Cited in the file of this patent

UNITED STATES PATENTS

| | | |
|---|---|---|
| 2,330,241 | Roberts | Sept. 28, 1943 |
| 2,589,800 | Goodale et al. | Mar. 18, 1952 |
| 2,604,545 | Inglis et al. | July 22, 1952 |
| 2,759,179 | Kircher | Aug. 14, 1956 |
| 2,808,463 | Jenkins et al. | Oct. 1, 1957 |
| 2,823,267 | Meacham | Feb. 11, 1958 |
| 2,831,178 | Ensink | Apr. 15, 1958 |
| 2,885,478 | Cerofolini | May 5, 1959 |